(12) United States Patent
Grainger et al.

(10) Patent No.: US 11,566,846 B2
(45) Date of Patent: Jan. 31, 2023

(54) RETAINED STRONG HEADER FOR HEAT EXCHANGER

(71) Applicant: Hanon Systems, Daejeon (KR)

(72) Inventors: James Grainger, London (GB); Leo Somhorst, Chislehurst (GB); David Bowring, Maldon (GB); Sotirios Zormpas, Chelmsford (GB); Jonathan Stansfield, Chelmsford (GB)

(73) Assignee: HANON SYSTEMS, Daejeon (KR)

( * ) Notice: Subject to any disclaimer, the term of this patent is extended or adjusted under 35 U.S.C. 154(b) by 195 days.

(21) Appl. No.: 16/691,878

(22) Filed: Nov. 22, 2019

(65) Prior Publication Data
US 2021/0156617 A1   May 27, 2021

(51) Int. Cl.
| F28D 1/02 | (2006.01) |
| F28D 1/053 | (2006.01) |
| F28F 9/02 | (2006.01) |
| B23P 15/26 | (2006.01) |

(52) U.S. Cl.
CPC ............ F28D 1/0233 (2013.01); B23P 15/26 (2013.01); F28D 1/05316 (2013.01); F28F 9/0219 (2013.01); *F28F 2275/085* (2013.01)

(58) Field of Classification Search
CPC ...... F28F 9/0219; F28F 9/0221; F28F 9/0224; F28F 9/0226; F28F 2275/085; F28F 2275/08; F16B 5/0096; F16B 5/0012; F16B 5/0044; F16B 5/0664; F16B 3/005
See application file for complete search history.

(56) References Cited

U.S. PATENT DOCUMENTS

| 5,845,705 | A | 12/1998 | Vinh et al. |
| 10,082,168 | B2 * | 9/2018 | Smith ................... F16B 5/0664 |
| 10,215,509 | B2 * | 2/2019 | Somhorst ................. F28D 1/00 |
| 10,823,509 | B2 * | 11/2020 | Suzuki .................. B21D 53/02 |
| 2015/0233652 | A1 | 8/2015 | Yamamoto et al. |
| 2017/0363372 | A1 | 12/2017 | Somhorst et al. |
| 2018/0080129 | A1 | 3/2018 | Drozdova et al. |
| 2019/0323456 | A1 * | 10/2019 | Hruza .................... F02M 26/29 |

FOREIGN PATENT DOCUMENTS

| DE | 2703528 A1 * | 8/1978 | ............ F28F 9/0226 |
| DE | 102014001690 A1 * | 8/2015 | ............ B21D 26/14 |
| FR | 1039911 A | 10/1953 | |
| FR | 2875592 A1 * | 3/2006 | ............ F28F 9/0226 |
| JP | 59109789 A * | 6/1984 | ............ F28F 9/0224 |
| JP | 2011191038 A | 9/2011 | |
| KR | 20140045029 A | 4/2014 | |

* cited by examiner

Primary Examiner — Jianying C Atkisson
Assistant Examiner — For K Ling
(74) Attorney, Agent, or Firm — Shumaker, Loop & Kendrick, LLP; James D. Miller (57) ABSTRACT

A heat exchanger includes a fluid reservoir having a peripherally extending foot, a header having a mounting tab bent to engage the foot of the fluid reservoir to couple the header to the fluid reservoir, and a retaining feature configured to prevent disengagement of the mounting tab of the header from the foot of the fluid reservoir. The retaining feature overlays at least a portion of an outer surface of the mounting tab while otherwise restrained by a portion of the fluid reservoir in order to prevent the disengagement of the mounting tab from the foot.

6 Claims, 8 Drawing Sheets

RETAINED STRONG HEADER FOR HEAT EXCHANGER

FIELD

The invention relates to a heat exchanger for a motor vehicle, and more particularly, to a retaining feature for securely coupling a fluid reservoir of the heat exchanger to a header of the heat exchanger.

BACKGROUND

Heat exchangers for use in automotive applications are generally formed of a core configured to facilitate an exchange of thermal energy with a fluid passing therethrough. A header is disposed on at least one end of the core, and provides an interface between the core and a fluid reservoir, such as a tank or manifold. In modern heat exchangers, an integrated means for coupling the fluid reservoir to the header is desirable. By using an integrated means for coupling the headers and fluid reservoirs, manufacturing costs can be substantially reduced by minimizing assembly time and eliminating unnecessary components. One common heat exchanger configuration using an integrated coupling means includes the fluid reservoir being coupled to the header by inserting a portion of the fluid reservoir into the header, and subsequently securing the fluid reservoir by a crimping process including deforming a plurality of tabs of the header over the inserted portion of the fluid reservoir.

However, in recent years, increased performance requirements for heat exchangers have caused existing configurations of such integrated coupling means to become insufficient. For example, modern heat exchangers operate at increased internal pressures, and especially when incompressible fluids such as water are used as the heat exchange fluid passed internally through the fluid reservoir of the associated heat exchanger. As the pressure within the fluid reservoir increases, the fluid reservoir is biased apart from the header, and the inserted portion of the fluid reservoir applies a bending moment to the tabs of the header. The bending moment forces the tabs of the header outward, allowing the fluid reservoir to separate from the header.

The crimping process also includes the deformation of the associated header in a manner that may lead to the presence of residual stress concentrations within the crimped portion of the header. These residual stress concentrations tend to produce a spring-back effect within the header that may cause the crimped portion of the header to be more susceptible to separation from the fluid reservoir when subjected to the above mentioned increased internal pressures.

Furthermore, modern heat exchangers are commonly integrated into rigid components of the vehicle, such as being directly mounted to an engine cylinder head of the vehicle. By rigidly mounting the heat exchanger within the vehicle, the heat exchanger is more susceptible to harmful vehicle vibrations. Accordingly, increased vibration of the heat exchanger further increases stresses in the interface between the header and the fluid reservoir, which may further promote an incidence of separation therebetween.

Such heat exchanges also tend to experience significant variations in temperature within the components thereof during operation of such heat exchangers. These temperature variations can generate stresses within such components as the result of the different degrees of thermal expansion of the different regions of the affected components. Furthermore, such temperature variations may also be cycled during use or between periods of use of such heat exchangers. The thermal cycling of such heat exchangers accordingly presents another potential mechanism for causing separation between the associated header and the fluid reservoir pairing.

Accordingly, there exists a need in the art for an improved means of coupling and retaining a fluid reservoir to a header of a heat exchanger.

SUMMARY

In concordance and attuned with the present invention, a heat exchanger having a retaining feature for preventing disengagement of the header from the fluid reservoir has surprisingly been discovered.

According to an embodiment of the instant disclosure, a heat exchanger comprises a fluid reservoir having a peripherally extending foot, a header having a mounting tab bent to engage the foot of the fluid reservoir to couple the header to the fluid reservoir, and a retaining feature configured to prevent disengagement of the mounting tab of the header from the foot of the fluid reservoir.

A method of manufacturing a heat exchanger is also disclosed. The method comprises the steps of: providing a fluid reservoir having a peripherally extending foot, and a header having a mounting tab; bending the mounting tab of the header to engage the foot of the fluid reservoir to couple the header to the fluid reservoir; and introducing a retaining feature configured to prevent disengagement of the mounting tab of the header from the foot of the fluid reservoir.

DRAWINGS

The above, as well as other objects and advantages of the invention, will become readily apparent to those skilled in the art from reading the following detailed descriptions of embodiments of the invention when considered in the light of the accompanying drawings of which.

DETAILED DESCRIPTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
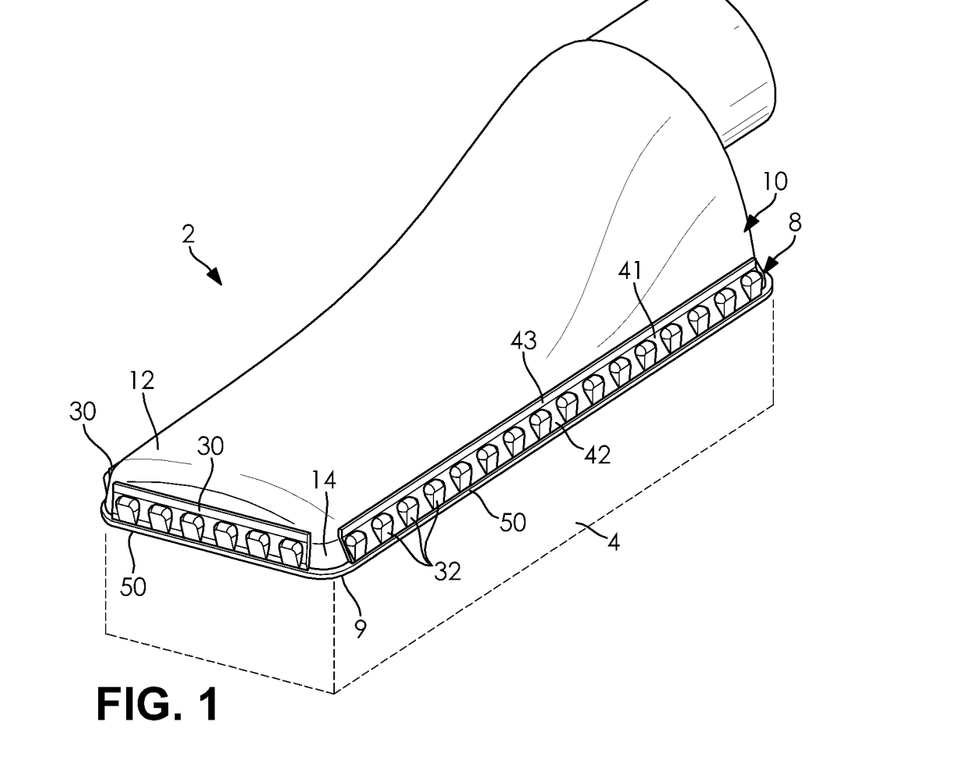
FIG. 1 is a perspective view of a heat exchanger having a fluid reservoir, a header, and a core according to an embodiment of the invention.
Figure 2:
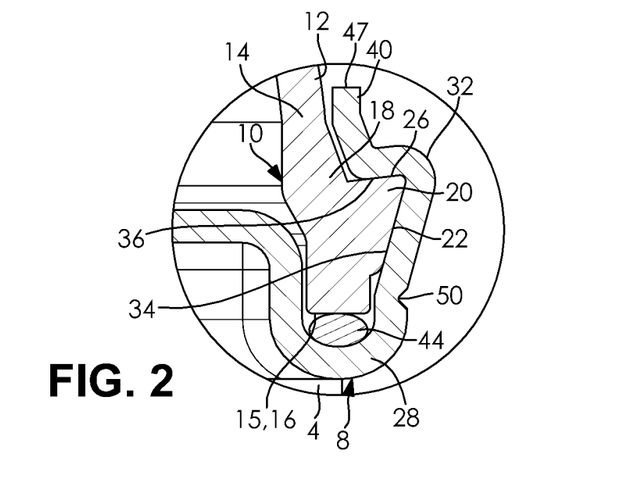
FIG. 2 is an enlarged fragmentary cross-sectional view of the heat exchanger of FIG. 1 showing engagement between the fluid reservoir and the header thereof.

FIGS. 1 and 2 illustrate an end portion of an integrated heat exchanger 2 according to the instant disclosure. The heat exchanger 2 is shown as including a core 4, a header 8, and a fluid reservoir 10. The fluid reservoir 10 forms one of an inlet or an outlet into the heat exchanger 2 with respect to a first fluid that is caused to flow through an interior of the heat exchanger 2, depending on the direction of flow of the first fluid. The header 8 forms an interface between an end of the core 4 and the fluid reservoir 10, and is configured to provide fluid communication between the fluid reservoir 10 and the core 4 with respect to the first fluid. The core 4 forms a heat exchanging portion of the heat exchanger 2 wherein the first fluid exchanges heat with a second fluid that is passed through the core 4 independently of the first fluid to prevent mixing therebetween.

As should be understood by one skilled in the art, the heat exchanger 2 may include an opposing header (not shown) and fluid reservoir (not shown) pairing at an opposite end (not shown) of the core 4 acting as the other of the inlet or the outlet into the heat exchanger 2, as desired. The present disclosure includes reference to only a single end of the heat exchanger 2 for simplicity and brevity, but the structures and methods disclosed herein may similarly be applied to the opposing end of the heat exchanger 2 without departing from the scope of the present invention.

The present invention is directed towards various different methods of retaining the header 8 to the fluid reservoir 10 following a coupling process for initially engaging the header 8 to the fluid reservoir 10, wherein the coupling process is explained briefly hereinbelow when describing the basic components of the heat exchanger 2 and how they correspond to each other. The disclosed methods of further retaining the header 8 to the fluid reservoir 10 may be desirable in situations where the heat exchanger 2 is subjected to relatively high internal fluid pressures that could cause rotation or axial movement of the header 8 relative to the fluid reservoir 10. The relatively high internal pressures may be caused by the use of an incompressible liquid as the first fluid passing through the fluid reservoir 10 and the header 8. The liquid may be a coolant such as water, glycol, or a mixture thereof, as non-limiting examples. The coolant may be configured to cool a heat generating component of a motor vehicle such as an engine block thereof. However, one skilled in the art should appreciate that alternative heat generating components may be associated with the heat exchanger 2 without departing from the scope of the present invention, such as an inverter or battery associated with an electrical or hybrid electric vehicle.

In some embodiments, the heat exchanger 2 may also be integrated directly into the structure of the heat generating component, which may cause the heat exchanger 2 to be further subjected to vibrations or other cyclical loads associated with operation of the heat generating component. The disclosed retaining methods and structures may accordingly be applied to the heat exchanger 2 under those circumstances wherein an elevated risk of separation between the header 8 and the fluid reservoir 10 is expected for any combination of the reasons disclosed above.

FIGS. 1 and 2 illustrate a generalized version of the heat exchanger 2 including the components and structures that are common to each of the methods and structures for retaining the header 8 to the fluid reservoir 10 disclosed herein. The additions or modifications to the structure of the header 8 and/or the fluid reservoir 10 in comparison to the generalized heat exchanger 2 of FIGS. 1 and 2 are described when discussing each of the different retaining methods as disclosed throughout FIGS. 3-18.

The header 8 is illustrated throughout the present disclosure as including a header frame 9 that surrounds and defines a central opening for providing the fluid communication between the fluid reservoir 10 and the core 4 with respect to the first fluid. However, depending on the type of core 4 utilized in the heat exchanger 2, the header 8 may include additional openings for forming additional flow paths between the fluid reservoir 10 and the core 4 with respect to the first fluid without departing from the scope of the present invention, as discussed briefly hereinbelow. The core 4 may be securely coupled to the header 8 or the core 4 may be formed integrally with the header 8, as desired, without necessarily departing from the scope of the present invention. The core 4 is illustrated in substantially schematic and cuboid form in FIG. 1 to illustrate the manner in which the methods and structures of the present invention may be applied to substantially any heat exchanger configuration including the use of a fluid reservoir 10 and the header 8 for distributing or receiving the first fluid from the core 4.

For example, the cuboid shape of the core 4 as it extends away from the header 8 may be considered representative of a plate-type heat exchanger core including a plurality of stacked plates (not shown) having manifold openings formed therein for passing the first fluid from one end of the core 4 to an opposing end of the core 4 while passing in the stacking direction of the plates. The stacked plates may further include additional manifold openings for passing the second fluid through the core 4. The stacked plates may form first flow channels for receiving the first fluid and segregated second flow channels for receiving the second fluid to allow for the heat exchange therebetween within the core 4 without mixing between the first and second fluids.

Alternatively, the cuboid shape of the core 4 may be representative of a plurality of individually provided tubes (not shown) extending in a longitudinal direction of the core 4, wherein the header 8 may include a corresponding number of openings for receiving an end portion of each of the associated tubes. Such a configuration may include the first fluid being passed through each of the tubes while the second fluid passes through the spaces provided between the adjacent ones of the tubes. In such circumstances, the second fluid may be air that is passed between the adjacent ones of the tubes. In other embodiments, the spaced apart tubes may be further surrounded by a housing structure for delimiting the flow of a liquid form of the second fluid when passing between the adjacent tubes forming the core 4.

However, one skilled in the art should appreciate that the methods and structures disclosed herein for coupling and retaining the fluid reservoir 10 to the header 8 may be applied to substantially any configuration of the associated core 4 without departing from the scope of the present invention. As such, the disclosed suitable configurations for the core 4 should be considered to be non-limiting, so long as the associated heat exchanger 2 utilizes the methods and structures for coupling the header 8 to the fluid reservoir 10 and retaining the connection therebetween as shown and described hereinafter.

The fluid reservoir 10 includes at least one continuous sidewall 12. A foot 14 of the fluid reservoir 10 depends from the sidewall 12 and extends around a perimeter of a portion of the fluid reservoir 10 defining an opening 15 for fluidly communicating with the header 8 and the core 4. The foot 14 includes a lip 16 defining the opening 15 of the fluid reservoir 10 and an intermediate portion 18 connecting the lip 16 and the sidewall 12. In the illustrated embodiment, the lip 16 of the fluid reservoir 10 is outwardly offset from and substantially parallel to a lower portion of the sidewall 12 to cause the intermediate portion 18 to be angled relative to the adjacent surface of the sidewall 12. However, in alternate embodiments, it will be appreciated that the lip 16 may be formed at an oblique angle relative to the sidewall 12, or that the lip 16 may be aligned with or inwardly offset relative to the sidewall 12, as desired.

Figure 5:
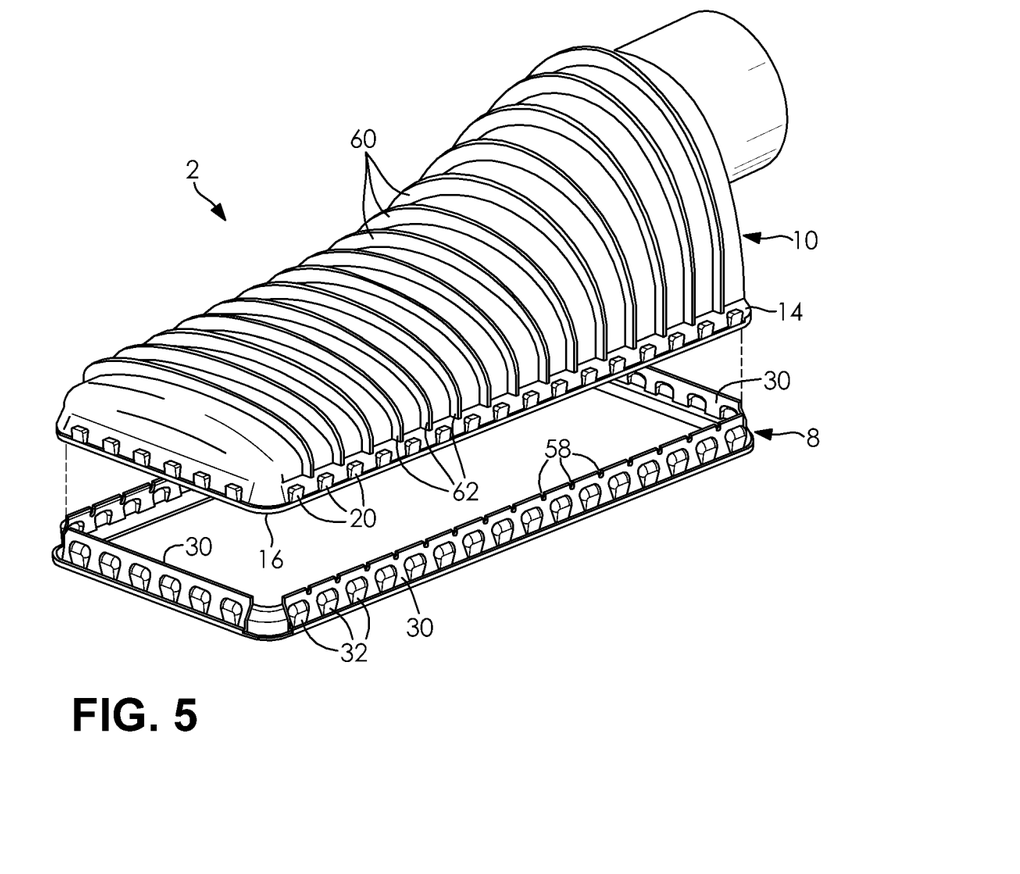
FIG. 5 is an exploded perspective view of a heat exchanger having a modified fluid reservoir and header according to an embodiment of the present invention.

A plurality of first coupling features 20 is spaced along the foot 14 of the fluid reservoir 10 with respect to the peripheral direction of the lip 16 (as best shown in the embodiment of the present invention illustrated in FIG. 5). Each of the first coupling features 20 is a protrusion extending outwardly from the intermediate portion 18 of the foot 14 adjacent the lip 16. An outer surface 22 of each of the first coupling features 20 is tapered outwardly as the outer surface 22 extends in a direction away from the lip 16 and towards the sidewall 12. An engaging surface 26 of each of the first coupling features 20 intersects the outer surface 22 and is tapered inwardly as the engaging surface 26 extends away from the outer surface 22. The engaging surface 26 also extends in a direction back towards the lip 16 while extending away from the intersection between the engaging surface 26 and the outer surface 22. This reversed inward tapering of the engaging surface 26 results in an acute angle being formed between the outer surface 22 and the engaging surface 26 of each of the first coupling features 20, wherein the resulting edge formed therebetween points in an outward direction away from the lip 16. Each of the first coupling features 20 also includes a pair of connecting walls for connecting the outer surface 22 and the engaging surface 26 to the intermediate portion 18 of the foot 14, wherein the connecting walls are arranged perpendicular to the outer surface 22 and the engaging surface 26 on each lateral side of each of the first coupling features 20. However, alternative configurations may be used without necessarily departing from the scope of the present invention, including the outer surface 22 being arranged substantially perpendicular relative to the corresponding engaging surface 26.

A base portion 28 of the header 8 circumscribes at least a portion of a perimeter of the header frame 9 and is configured to receive at least a portion of the foot 14 of the fluid reservoir 10 therein. In the embodiment illustrated, the base portion 28 is recessed to receive the at least a portion of the foot 14 of the fluid reservoir 10. However, the base portion 28 may alternatively be provided as planar or may have other configurations configured to receive the foot 14 of the fluid reservoir 10, as desired.

In the illustrated embodiment, a plurality of mounting tabs 30 extend from the base portion 28 of the header frame 9, wherein a single one of the mounting tab 30 extends longitudinally to span a majority of a length of each of the four illustrated sides of the header 8. However, in alternate embodiments, each of the sides of the header 8 may include a plurality of separately formed mounting tabs 30 spaced from each other with respect to the longitudinal direction of the corresponding side, as desired, without departing from the scope of the present invention.

Each of the mounting tabs 30 generally includes a sidewall 40 extending away from the base portion 28 of the header 8 and a plurality of second coupling features 32 projecting outwardly from the sidewall 40. The second coupling features 32 are spaced apart from each other with respect to a longitudinal direction of each of the mounting tabs 30, which also corresponds to a peripheral direction of the header frame 9. A position of each of the second coupling features 32 with respect to the peripheral direction of the header frame 9 corresponds to a position of a respective one of the first coupling features 20 of the fluid reservoir 10, wherein the second coupling features 32 are configured to engage the first coupling features 20 to secure the fluid reservoir 10 to the header 8 during the coupling process. In the illustrated embodiment, each of the second coupling features 32 is an enclosed cavity configured to receive at least a portion of the respective one of the first coupling features 20 therein.

The cavity of each of the second coupling features 32 is defined at least partially by an inner surface 34 and a receiving surface 36. The inner surface 34 extends away from the base portion 28 of the header 8 and the receiving surface 36 intersects and extends away from the inner surface 34. As can be seen in FIG. 2, the inner surface 34 of each of the second coupling features 32 has an outward taper corresponding to the outward taper of the outer surface 22 of each of the first coupling features 20 while the receiving surface 36 of each of the second coupling features has an inward taper corresponding to the inward taper of the engaging surface 26 of each of the first coupling features 20. An acute angle is accordingly formed between the inner surface 34 and the receiving surface 36 of each of the second coupling features 32 to substantially correspond to the acute angle formed between the outer surface 22 and the engaging surface 26 of each of the first coupling features 20. The similarity in shape between each of the first coupling features 20 and each of the second coupling features 32 allows for one of the first coupling features 20 to be received into a corresponding one of the second coupling features 32 in a substantially nested configuration. Each of the second coupling features 32 also includes a pair of connecting walls for connecting the inner surface 34 and the receiving surface 36 back towards sidewall 40 of the corresponding mounting tab 30, wherein the connecting walls of the second coupling features 32 are configured to surround and receive the connecting walls of the first coupling features 20 therein when placed in the aforementioned nested configuration.

Each of the sidewalls 40 of the mounting tabs 30 may include a reinforcement feature 41 formed by a bend or angle present in each of the respective sidewalls 40. The reinforcement features 41 are configured to militate against a deflection of the receiving surface 36 of each of the second coupling features 32 when a compressive force is applied between the header 8 and the fluid reservoir 10 during reception of the lip 16 of the fluid reservoir 10 within the base portion 28 of the header 8. The reinforcement features 41 may be formed by a first portion 42 of the sidewall 40 extending away from the base portion 28 and a second portion 43 of the sidewall 40 extending between the first portion 42 and a distal surface 47 of the sidewall 40 spaced at a maximum distance from the base portion 28 with respect to each of the mounting tabs 30. The first portion 42 and the second portion 43 may intersect each other at a position wherein the receiving surface 36 of each of the second coupling features 32 intersects the sidewall 40. The first portion 42 and the second portion 43 of each of the sidewalls 40 may be configured to substantially correspond to an outer profile of the foot 14 of an underlying portion of the fluid reservoir 10 when the corresponding mounting tab 30 is in the coupled position.

In alternative embodiments, the first coupling features 20 and the second coupling features 32 can be structurally configured as any type of interlocking features as desired for preventing removal of the header 8 from the fluid reservoir 10. For example, the coupling features 20, 32 can have alternative perimeter shapes instead of being substantially rectangular, as illustrated, such as being substantially circular, substantially ovular, or substantially triangular, as non-limiting examples. The coupling features 20, 32 may also be provided to include alternative nesting cross-sectional shapes, as desired.

The header 8 further includes deformation features 50 formed therein. Each of the deformation features 50 is provided as a continuous and elongate indentation formed in an outer surface of the header 8 along a length of each of the mounting tabs 30. In the provided embodiment, each of the deformation features 50 is shown as extending longitudinally along an intersection between an outer surface of each of the mounting tabs 30 and an outer surface of the base portion 28 of the header 8. However, in other embodiments, the deformation features 50 can be formed on an inner surface of the header 8 at any desired position therein to facilitate a bending of the mounting tabs 30 inwardly towards the fluid reservoir 10 during a coupling of the fluid reservoir 10 to the header 8.

A thickness of the header 8 at each of the deformation features 50 is less than a thickness of the portions of each of mounting tabs 30 devoid of one of the deformation features 50. As shown in FIG. 2, the deformation features 50 have an arcuate cross-sectional profile as they protrude into each of the mounting tabs 30. However, the deformation features 50 can have other cross-sectional profiles, as desired, such as triangular, rectangular, or serpentine profiles, for example.

Each of the deformation features 50 may alternatively be provided as a plurality of perforations, a plurality of slots, a plurality of indentations, or any other surface feature configured to aid in assembly of the header 8 to the fluid reservoir 10 via a bending of the mounting tabs 30 in the prescribed manner, as desired.

The deformation features 50 are provided to aid in bending each of the mounting tabs 30 either outwardly to aid in receiving the foot 14 of the fluid reservoir 10 therein or inwardly following reception of the foot 14 within the base portion 28 of the header 8. For example, each of the mounting tabs 30 may originally be provided to be flared outwardly (not shown) before being bent inwardly to engage the foot 14 of the fluid reservoir 10 as is shown throughout the provided figures.

A continuously formed sealing element 44 is disposed in the recessed portion of the base portion 28 of the header 8. In the illustrated embodiment, the sealing element 44 is formed separately from each of the fluid reservoir 10 and header 8. However, the sealing element 44 may be integrally formed with or otherwise securely coupled to at least one of the fluid reservoir 10 and header 8. The sealing element 44 may be formed of a resilient polymeric material, such as a flouroelastomer (FKM) or an ethylene propylene diene monomer (EPDM). Other suitable materials for the sealing element 44 will be appreciated by those of ordinary skill in the art.

It is understood that other configurations of the header 8 can be contemplated, as desired, without departing from the scope of the disclosure. In the embodiments illustrated, the header 8 includes a substantially rectangular perimeter shape. However, the header 8 can be any perimeter shape, as desired, including an elliptical shape, a triangular shape, or other shapes.

The fluid reservoir 10 may be formed from a substantially rigid polymeric material such as plastic while the header 8 may be formed from a substantially rigid metallic material such as aluminum. However, one skilled in the art will readily appreciate that the header 8 and the fluid reservoir 10 may be formed from any number of a variety of different materials consistent with the methods and structures disclosed herein, so long as the header 8 and the fluid reservoir 10 are capable of being elastically deformed and/or plastically deformed into the shapes and configurations disclosed hereinafter in order to retain the header 8 to the fluid reservoir 10.

During assembly of the heat exchanger 2, the fluid reservoir 10 is secured to the header 8 by inserting the foot 14 of the fluid reservoir 10 into the base portion 28 of the header 8. In a first step, the fluid reservoir 10 is aligned with the header 8, wherein the foot 14 of the sidewall 12 is aligned with the base portion 28 of the header 8 with respect to a direction of insertion of the fluid reservoir 10 into the header 8. The mounting tabs 30 may be predisposed in the outwardly flared position such that the mounting tabs 30 are spread apart from each other to facilitate unobstructed entry of the foot 14 into the base portion 28 of the header 8. Alternatively, it should be appreciated that the mounting tabs 30 may be actively bent from the illustrated position (when coupled to the fluid reservoir 10 in FIGS. 1 and 2) to the outwardly flared position immediately prior to or during assembly of the heat exchanger 2, as desired.

In a second step, the fluid reservoir 10 is advanced into the header 8, wherein the foot 14 of the fluid reservoir 10 passes by the mounting tabs 30 of the header 8. As the lip 16 of the fluid reservoir 10 is received in the base portion 28, the sealing element 44 is compressed by the lip 16 to form a fluid tight seal between the fluid reservoir 10 and the header 8. With the sealing element 44 compressed in the base portion 28, the first coupling features 20 are aligned with and ready to be received within the second coupling features 32.

The mounting tabs 30 are bent inwardly towards the fluid reservoir 10 from the outwardly flared position to a coupled position by applying a lateral force to the mounting tabs 30. Specifically, the mounting tabs 30 are bent about a pivot point proximate to the deformation features 50. It is understood proximate to mean at, nearly accurate, almost, or next to but very near. In one exemplary embodiment, the mounting tabs 30 can be bent inwardly by an elastic force of the mounting tabs 30 when the base 14 is positioned within the base portion 28. In another exemplary embodiment, the mounting tabs 30 can be manually bent inwardly during an assembly process such as crimping or similar processes. It will be understood that a combination of the elastic force and manual bending may be utilized to move the mounting tabs 30 to the closed position. As the force is applied to the mounting tabs 30, the deformation features 50 minimize an amount of the force required to bend the mounting tabs 30 without negatively affecting the rigidity and integrity of the mounting tabs 30 during operation of the heat exchanger 2.

In the coupled position, the engaging surfaces 26 of the first coupling features 20 cooperate with the receiving surfaces 36 of the second coupling features 32 to secure the foot 14 of the fluid reservoir 10 to the base portion 28 of the header 8, while also maintaining the compressive force on the sealing element 44 for establishing the fluid tight seal. Accordingly, the second coupling features 32 are compressed against the first coupling feature 20. When each of the engaging surfaces 26 and each of the receiving surfaces 36 are inclined, the compressive force causes the receiving surfaces 36 of the second coupling features 32 to be biased inward by the engaging surfaces 26 of the first coupling features 20, further securing the fluid reservoir 10 by preventing the mounting tab 30 from bending outwardly away from the foot 14.

The first coupling features 20 and the second coupling features 32 may have alternative shapes and configurations to those shown and described without necessarily departing from the scope of the present invention. For example, the disclosed tapering of the surfaces of the coupling features 20, 32 may be varied so long as the structure of the first coupling features 20 obstructs removal of the second coupling features 32 therefrom. In other words, different structural configurations providing interference for preventing bending of the disclosed mounting tabs 30 away from the foot 14 of the fluid reservoir 10 may be utilized without necessarily departing from the scope of the present invention. Additionally, the mounting tabs 30 may also be provided devoid of each of the disclosed surfaces forming the second coupling features 32 prior to the initiation of the crimping process. Instead, the crimping process may itself introduce the interfering contours into the mounting tabs 30 for forming the second coupling features 32, wherein the crimping process includes the deformation of the mounting tabs 30 relative to the contours of the first coupling features 20.

Figure 3:
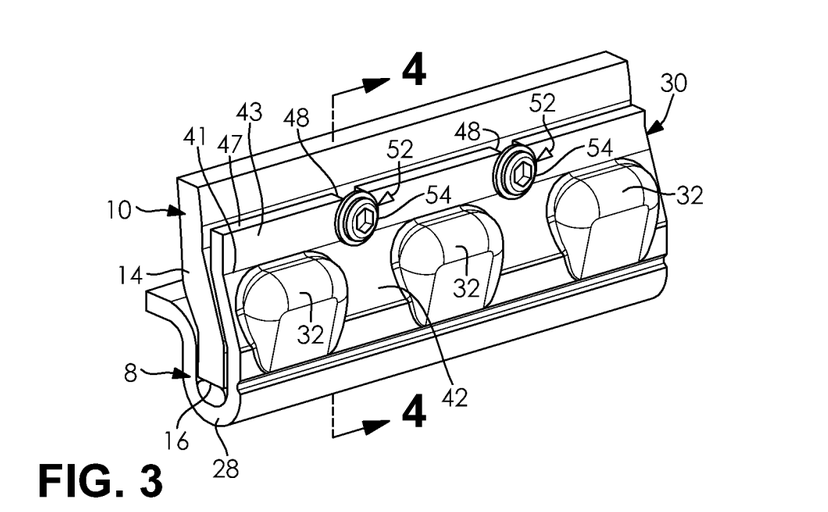
FIG. 3 is an enlarged fragmentary cross-sectional perspective view of a retaining feature of the heat exchanger of FIG. 1 according to an embodiment of the present invention.
Figure 4:
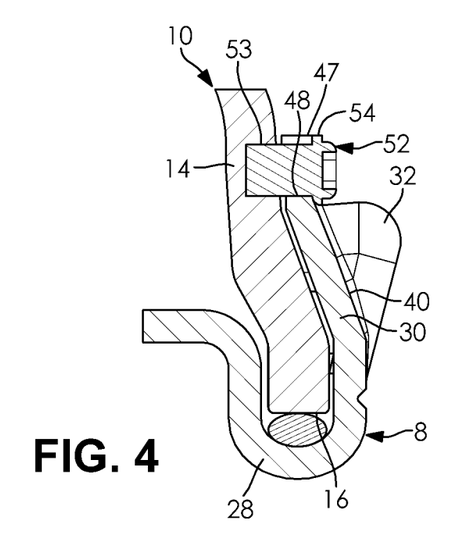
FIG. 4 is an enlarged fragmentary cross-sectional view of the heat exchanger as taken from the perspective of section lines 4-4 of FIG. 3.

Referring now to FIGS. 3 and 4, a structure and accompanying method for retaining the header 8 to the fluid reservoir 10 is disclosed according to a first embodiment of the present invention. The first embodiment includes a modification of the structure of at least one of the mounting tabs 30 of the header 8, and preferably at least two opposing ones of the mounting tabs 30 formed on opposite sides of the fluid reservoir 10. Additional mounting tabs 30 may include the modified structure without departing from the scope of the present invention.

Each of the modified mounting tabs 30 includes a plurality of openings 48 formed therein. In the illustrated embodiment, the openings 48 are shown as notches or indentations extending longitudinally in a direction from the distal surface 47 of the sidewall 40 towards the base portion 28 of the header 8. The direction of extension of the openings 48 may be substantially similar to the direction of insertion of the fluid reservoir 10 into the base portion 28 of the header 8. The openings 48 may extend longitudinally from the distal surface 47 to an intersection between the first portion 42 and the second portion 43 of the sidewall 40. However, the openings 48 may extend any desired distance towards the base portion 28 of the header 8, as desired.

Each of the openings 48 may be positioned at intervals interposed between adjacent ones of the second coupling features 32 with respect to the longitudinal direction of the corresponding one of the mounting tabs 30 to avoid interference with the second coupling features 32. However, the openings 48 may alternatively be arranged in alignment with the second coupling features 32 without necessarily departing from the scope of the present invention.

Each of the openings 48 is configured to receive a corresponding fastener 52 therein. Each of the fasteners 52 may include a threaded shaft 53 for penetrating the foot 14 of the fluid reservoir 10 and a head 54 having a larger outer diameter than a width of the corresponding opening 48 for engaging an outer surface of the sidewall 40 of the corresponding mounting tab 30. The head 54 of each of the fasteners 52 may be contoured for engagement with a corresponding tool configured to rotate the fastener 52 during the process of penetrating the foot 14 of the fluid reservoir 10. A length of the threaded shaft 53 of each of the fasteners 52 may also be selected to not fully penetrate the foot 14 of the fluid reservoir 10 when the head 54 engages the outer surface of the mounting tab 30 to avoid leakage of the first fluid from the fluid reservoir 10. Each of the fasteners 52 may be in the form of a machine bolt, as desired. However, one skilled in the art will appreciate that alternative fastener types may be used without departing from the scope of the present invention.

The openings 48 may alternatively be provided as through-holes (not shown) formed within the sidewall 40 and not extending to the distal surface 47 thereof, as desired. The through-holes may be provided to have an inner diameter substantially equal to, slightly smaller than, or slightly greater than the outer diameter of the threaded shaft 53, so long as a portion of the head 54 obstructs the adjacent portion of the mounting tab 30. The through-holes may be provided at any suitable positions on the corresponding mounting tabs 30 so long as they do not interfere with the interaction between the first coupling features 20 and the second coupling features 32.

The threaded fasteners 52 accordingly form retaining features for preventing an outward bending of each of the associated mounting tabs 30 away from the foot 14 of the fluid reservoir 10.

FIGS. 5-9 illustrate a structure and method for retaining the header 8 to the fluid reservoir 10 according to a second embodiment of the present invention. As shown in FIG. 5, the fluid reservoir 10 further includes a plurality of spaced apart ribs 60 projecting outwardly from the outer surface of the fluid reservoir 10. In the provided embodiment, the ribs 60 extend arcuately from one longitudinal side of the foot 14 to an opposing longitudinal side of the foot 14 while spaced from each other in the longitudinal direction of the fluid reservoir 10. The ribs 60 are positioned such that each of two opposing end portions 62 of each of the ribs 60 extends towards a space formed between two adjacent ones of the first coupling features 20 while each of the end portions 62 extends in a direction towards the lip 16 of the fluid reservoir 10.

Figure 6:
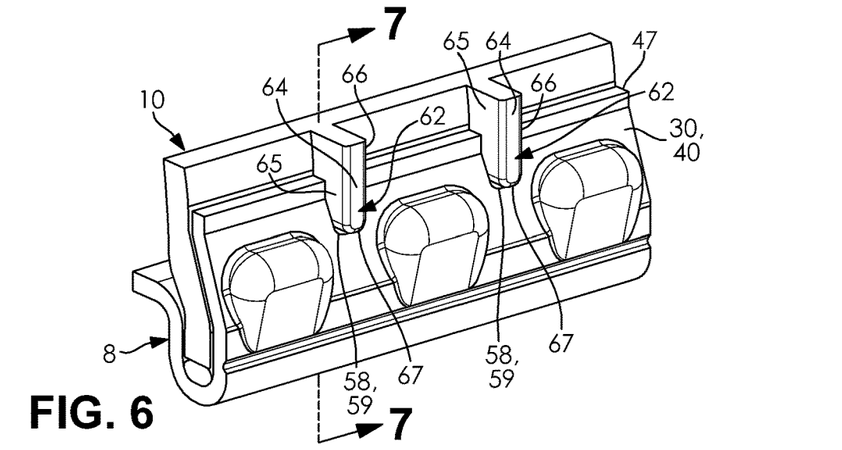
FIG. 6 is an enlarged fragmentary cross-sectional perspective view of the heat exchanger of FIG. 5 prior to the formation of a retaining feature according to an embodiment of the present invention.

As best shown in FIG. 6, each of the end portions 62 is defined by an outer surface 64 spaced distally from the outer surface of the fluid reservoir 10, a first side surface 65 connecting the outer surface 64 of the end portion 62 to the outer surface of the fluid reservoir 10, a second side surface 66 arranged opposite the first side surface 65 and also connecting the outer surface 64 of the end portion 62 to the outer surface of the fluid reservoir 10, and an end surface 67 connecting the outer surface 64 of the end portion 62 to the outer surface of the fluid reservoir 10 while also connecting the first side surface 65 to the second side surface 66. The first side surface 65, the second side surface 66, and the end surface 67 cooperate to define a perimeter shape of each of the end portions 62 of each of the ribs 60.

However, the ribs 60 may have any configuration so long as the end portion 62 of at least one of the ribs 60 extends towards the lip 16 of the fluid reservoir 10 while approaching in a direction arranged perpendicular to the peripheral direction of the lip 16. The ribs 60 are also positioned in a manner wherein the end portions 62 of the ribs 60 do not interfere with the interaction between the first coupling features 20 and the second coupling features 32. For example, the ribs 60 may project directly towards the pairings of the coupling features 20, 32 so long as the end portions 62 of the ribs 60 terminate short of the coupling features 20, 32.

Additionally, although not shown in the illustrated embodiment, the fluid reservoir 10 may include a second set of the ribs 60 crossing the illustrated first set of the ribs 60, with the second set of the ribs 60 extending from one longitudinal end of the fluid reservoir 10 towards an opposing longitudinal end of the fluid reservoir 10 to form a grid-like pattern of the ribs 60. This configuration results in the end portions 62 of the ribs 60 extending towards the foot 14 at spaced intervals around an entirety of the periphery of the foot 14 instead of just along the longitudinal sides thereof. The ribs 60 may generally be provided to reinforce the fluid reservoir 10 against deformation or bending as may be caused by thermal gradients formed within the fluid reservoir 10 or by stresses caused by the heightened fluid pressures experienced within the heat exchanger 2 (in addition to playing a role in retaining the header 8 to the fluid reservoir 10 as described hereinafter).

The header 8 once again includes the addition of openings 58 provided as notches or indentations extending from the distal surface 47 of the sidewall 40 of at least one of the mounting tabs 30. The openings 58 are preferably formed on at least two opposing ones of the mounting tabs 30, such as being formed on each of the opposing longitudinal sides of the header 8 corresponding to each of the longitudinal sides of the foot 14 of the fluid reservoir 10. However, the openings 58 may be formed on any of the mounting tabs 30 provided on the header 8 so long as the openings 58 are positioned relative to the end portions 62 of the ribs 60 as described hereinafter. The openings 58 may, for example, be provided on each of the mounting tabs 30 extending around the periphery of the header frame 9 if the corresponding fluid reservoir 10 includes the end portions 62 of the ribs 60 extending towards the lip 16 around the periphery of the lip 16, such as by use of the grid-like pattern of the ribs 60 as discussed hereinabove.

As can be seen in FIG. 6, the openings 58 are configured to receive the end portions 62 of the ribs 60 therein when the corresponding mounting tab 30 is bent or folded towards the foot 14 of the fluid reservoir 10 to form the coupling between the first and second coupling features 20, 32. The openings 58 are accordingly spaced from each other with respect to the peripheral direction of the header frame 9 to match the spacing between adjacent ones of the ribs 60 having end portions 62 extending towards the lip 16 of the fluid reservoir 10.

Each of the openings 58 may be selected to have a perimeter shape substantially corresponding to a perimeter shape of the end portion 62 of a corresponding one of the ribs 60. Each of the openings 58 accordingly includes a width substantially equal to or slightly greater than a width of the end portion 62 of the corresponding one of the ribs 60 as well as a length measured from the distal surface 47 of the sidewall 40 that is substantially equal to or slightly greater than a length that the end portion 62 of the corresponding one of the ribs 60 extends beyond the distal surface 47 of the sidewall 40 when extending towards the lip 16 of the fluid reservoir 10. In the provided example, the end portion 62 of each of the ribs 60 includes a rounded-rectangular contour while each of the openings 58 similarly has a corresponding rounded-rectangular contour, but any nesting perimeter shapes may be used without departing from the scope of the present invention.

The header 8 is coupled to the fluid reservoir 10 by bending or folding each of the mounting tabs 30 towards the foot 14 of the fluid reservoir 10 while also receiving the end portions 62 of the ribs 60 into the openings 58 present within at least one (and preferably multiple) of the mounting tabs 30. The bending or folding of the mounting tabs 30 also includes the previously disclosed engagement between the first and second coupling features 20, 32 to initially secure the header 8 to the fluid reservoir 10.

Figure 7:
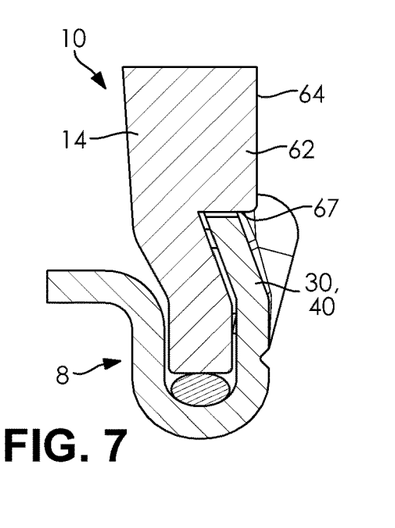
FIG. 7 is an enlarged fragmentary cross-sectional view of the heat exchanger as taken from the perspective of section lines 7-7 of FIG. 6.

A distance each of the ribs 60 projects outwardly from the outer surface of the fluid reservoir 10 along the sidewall 12 and the foot 14 thereof is selected to be greater than a thickness of the mounting tabs 30 at each of the openings 58. As a result, the outer surface 64 of each of the end portions 62 is disposed outwardly beyond the outer surface of the sidewall 40 of the corresponding one of the mounting tabs 30 when the end portions 62 are received in the openings 58. More specifically, the outer surface 64 of each of the end portions 62 is disposed outwardly beyond an edge 59 intersecting the outer surface of the corresponding mounting tab 30 and defining the perimeter shape of the corresponding one of the openings 58. This configuration results in at least a portion of the first side surface 65, the second side surface 66, and the end surface 67 of each of the end portions 62 extending outwardly beyond the edge 59 defining the corresponding one of the openings 58, as best shown in FIGS. 6 and 7.

An additional step for retaining the header 8 to the fluid reservoir 10 includes plastically deforming the end portion 62 of each of the ribs 60 projecting outwardly beyond the edge 59 of one of the openings 58. The deforming may be accomplished by applying heat to each of the end portions 62 in a manner facilitating a softening or melting of the material forming each of the end portions 62, which may be the polymeric plastic material described hereinabove. The heat may be applied by a tool utilizing electrical resistance to generate and transfer heat directly to the material forming each of the end portions 62. Alternatively, the heat may be applied by a tool configured to perform an ultrasonic heating process with respect to the material forming each of the end portions 62, thereby causing heat to be generated by the interaction between the material and the ultrasonic waves generated by the ultrasonic heating tool. In either event, the tool may have any desired shape and configuration for transferring heat to the material forming each of the end portions 62 in a manner resulting in a desired shape of a deformed portion 68 of each of the end portions 62. A plurality of the tools may be provided to allow for a plurality of the end portions 62 to be deformed simultaneously in a common manufacturing step, as desired.

Figure 8:
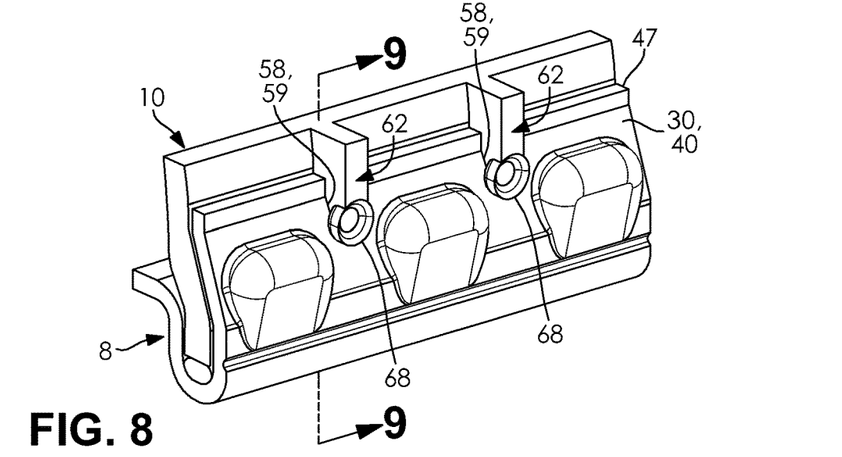
FIG. 8 is an enlarged fragmentary cross-sectional perspective view of the heat exchanger of FIG. 5 following the formation of the retaining feature.
Figure 9:
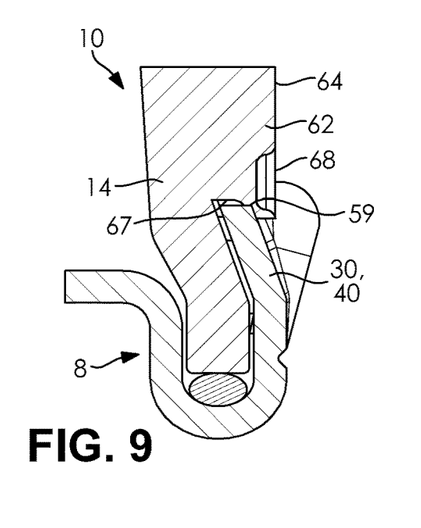
FIG. 9 is an enlarged fragmentary cross-sectional view of the heat exchanger as taken from the perspective of section lines 9-9 of FIG. 8.

For example, FIGS. 8 and 9 show the end portions 62 after having been deformed by a tool having a circular area of influence for forming deformed portions 68 that are substantially circular in perimeter shape, and therefore substantially cylindrical in three-dimensional shape. The deformed portions 68 accordingly include the outer surface 64 of each of the end portions 62 being depressed in a circular shape while the flow of the adjacent material causes the first side surface 65, the opposing second side surface 66, and the end surface 67 to flare radially outwardly relative to a central position of the corresponding tool. This radial outward flow of the material as the material is thinned leads to the resulting cylindrical shape of each of the deformed portions 68.

Each of the deformed portions 68 is accordingly formed in a manner wherein at least a portion of each of the deformed portions 68 extends radially outwardly relative to the center of the area of influence of the tool beyond the edge 59 defining the corresponding opening 58 to provide mechanical interference between the deformed portion 68 and the corresponding edge 59. Each of the deformed portions 68 may accordingly be described as being formed to include a width measured parallel to the longitudinal direction of the corresponding mounting tab 30 that is greater than the width of the corresponding opening 58 in that same direction, thereby ensuring that one or both of the opposing portions of the corresponding edge 59 are overlayed by the enlarged deformed portion 68. In the illustrated embodiment, each of the deformed portions 68 is also extended beyond each of the corresponding edges 59 adjacent each of the end surfaces 67 to cause each of the deformed portions 68 to interfere with the corresponding mounting tab 30 at an end portion of each of the openings 58 as well as two lateral sides of each of the openings 58.

One skilled in the art should appreciate that any shape of tool configured for forming any suitable shape of each of the deformed portions 68 may be utilized without departing from the scope of the present invention, so long as the resulting deformed portions 68 provide mechanical interference with the mounting tabs 30 at the corresponding openings 58 formed therein. The deformed portions 68 may accordingly be formed to include a triangular perimeter shape, a rectangular perimeter shape, a hexagonal perimeter shape, or an elliptical perimeter shape, as non-limiting examples, without departing from the scope of the present invention.

FIGS. 10-13 illustrate a structure and method for retaining the header 8 to the fluid reservoir 10 according to a third embodiment of the present invention. The third embodiment includes the addition of at least one coupling rib 70 to the outer surface of the fluid reservoir 10 while the header 8 is provided in substantially the same form as shown and described in FIG. 1. Each of the coupling ribs 70 may be provided to extend longitudinally in a direction parallel to the peripheral direction of the foot 14. The coupling rib 70 may be positioned on the fluid reservoir 10 such that the end portions 62 of the ribs 60 merge into the coupling rib 70 adjacent the foot 14 of the fluid reservoir 10.

The coupling rib 70 includes a first surface 71 facing away from the foot 14 and an oppositely arranged second surface 72 facing towards the foot 14. The second surface 72 is positioned to be disposed immediately adjacent the distal surface 47 of the corresponding mounting tab 30 while also extending parallel thereto following the bending of the mounting tab 30 to the coupled position shown throughout FIGS. 10-13. The first surface 71 and the second surface 72 are arranged transverse to the adjacent portions of the outer surface of the fluid reservoir 10 with an outer surface 74 of the coupling rib 70 spaced outwardly from the adjacent portions of the outer surface of the fluid reservoir 10 from which the coupling rib 70 projects. Specifically, the outer surface 74 of the coupling rib 70 is disposed outwardly of the outer surface of the sidewall 40 of the corresponding mounting tab 30 adjacent the distal surface 47 thereof.

Figure 10:
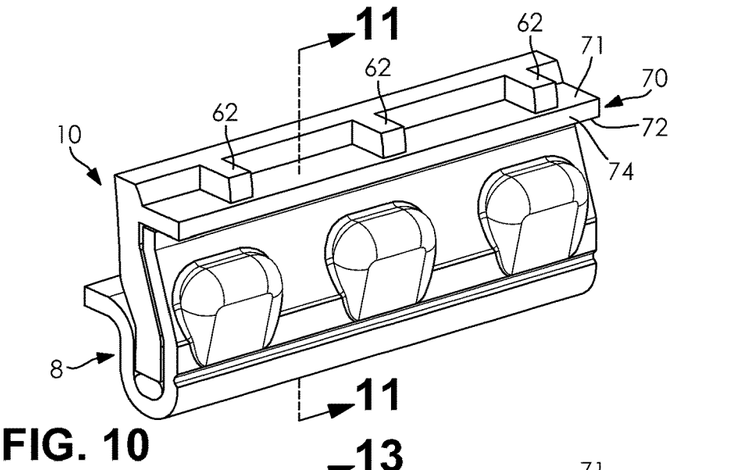
FIG. 10 is an enlarged fragmentary cross-sectional perspective view of a modified heat exchanger prior to the formation of a retaining feature according to an embodiment of the present invention.
Figure 11:
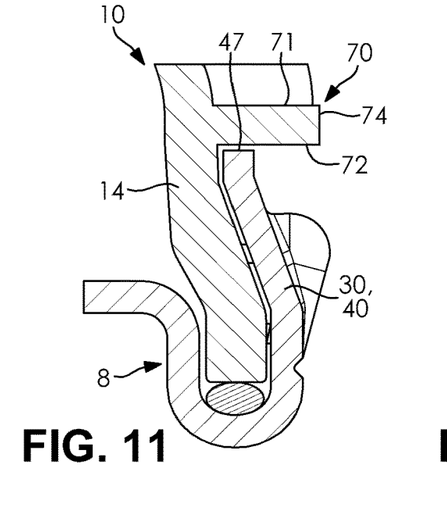
FIG. 11 is an enlarged fragmentary cross-sectional view of the heat exchanger as taken from the perspective of section lines 11-11 of FIG. 10.
Figure 12:
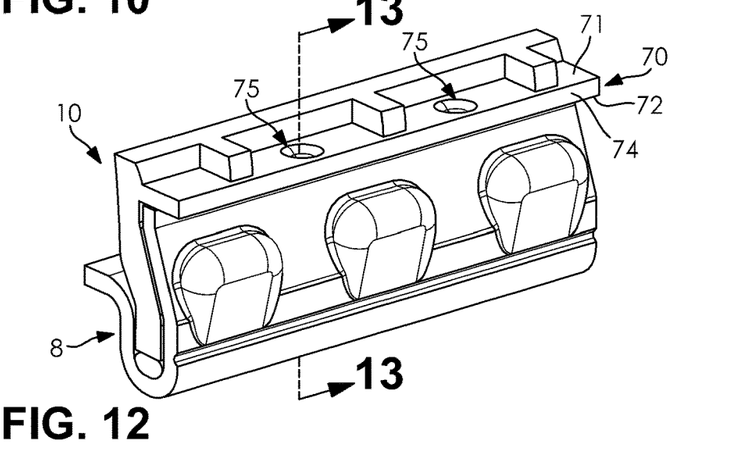
FIG. 12 is an enlarged fragmentary cross-sectional perspective view of the heat exchanger of FIG. 10 following the formation of the retaining feature.

As shown by comparison between FIGS. 10 and 12, following the bending of the mounting tab 30 to the coupled position, the coupling rib 70 is plastically deformed to produce a plurality of deformed portions 75 therein, wherein the deformed portions 75 are spaced from each other with respect to the peripheral direction of the foot 14. In the provided example, the deformed portions 75 are interposed between adjacent end portions 62 of the ribs 60 intersecting the coupling rib 70, but one skilled in the art should appreciate that any spacing or positioning of the deformed portions 75 may be utilized without departing from the scope of the present invention, including the formation of the deformed portions 75 within the coupling rib 70 in the absence of the ribs 60 projecting from the outer surface of the fluid reservoir 10.

Figure 13:
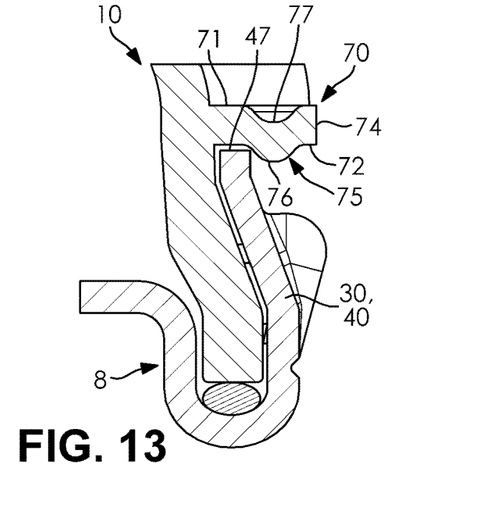
FIG. 13 is an enlarged fragmentary cross-sectional view of the heat exchanger as taken from the perspective of section lines 13-13 of FIG. 12.

Each of the deformed portions 75 includes a projection 76 projecting from the second surface 72 of the coupling rib 70 and towards the lip 16 of the fluid reservoir 10 as well as a corresponding depression 77 formed in the opposing portion of the first surface 71 of the coupling rib 70. As shown in FIG. 13, an apex of the projection 76 projects beyond the distal surface 47 of the sidewall 40 of the mounting tab 30 in a manner causing each of the projections 76 to form a mechanical obstruction for preventing outward bending of the mounting tab 30 relative to the foot 14 of the fluid reservoir 10. The formation of the deformed portions 75 within the coupling rib 70 accordingly aids in retaining the mounting tab 30 in the coupled position by mechanically blocking the movement of the mounting tab 30 away from the coupled position.

The deformed portions 75 may be formed using substantially similar techniques to those described hereinabove with reference to the deformed portions 68. Specifically, the material forming the fluid reservoir 10 may first be heated by means of electrical resistance heating or ultrasonic heating to soften or otherwise melt the material in a manner sufficient for deforming the material. In some embodiments, the heating of the material may cause the material to flow downwardly by the force of gravity to the configuration shown in FIG. 13. In other embodiments, the heating of the material may be combined with the use of a suitable tool for pressing on the coupling rib 70 in a direction from the first surface 71 towards the second surface 72 for mechanically deforming the softened or melted material comprising the coupling rib 70. In other embodiments, the coupling rib 70 may be formed from a material capable of being deformed exclusively by mechanical means in the absence of additional heating for softening the material to be deformed, as desired.

In the provided example, an entirety of the first surface 71 is arranged substantially parallel to the second surface 72 to cause the coupling rib 70 to have a substantially constant thickness including at the position of each of the deformed portions 75. However, in contrast, the coupling rib 70 may be modified to include a reduced thickness (not shown) at each location wherein one of the deformed portions 75 is to be formed, thereby allowing for the coupling rib 70 to be more easily deformed to project to a position for interfering with movement of the mounting tab 30 away from the foot 14 while otherwise maintaining the strength and rigidity of the coupling rib 70. For example, each location on the first surface 71 of the coupling rib 70 to be deformed may be indented relative to the remainder of the first surface 71 for reducing the thickness of the material pressed beyond the second surface 72 of the coupling rib 70 when forming the projections 76. Additionally, the portion of the coupling rib 70 intended to be deformed may also be provided as a web or other discontinuous feature for similarly facilitating the deformation of the coupling rib 70 when forming the deformed portions 75. For example, a cylindrical opening (not shown) formed through the coupling rib 70 from the first surface 71 to the second surface 72 thereof may include a plurality of spoke-like connections extending diametrically across the cylindrical opening adjacent the second surface 72, wherein the spoke-like connections are heated to be flexible enough to be formed into the shape of the projections 76 for obstructing movement of the mounting tab 30 away from the foot 14.

Figure 14:
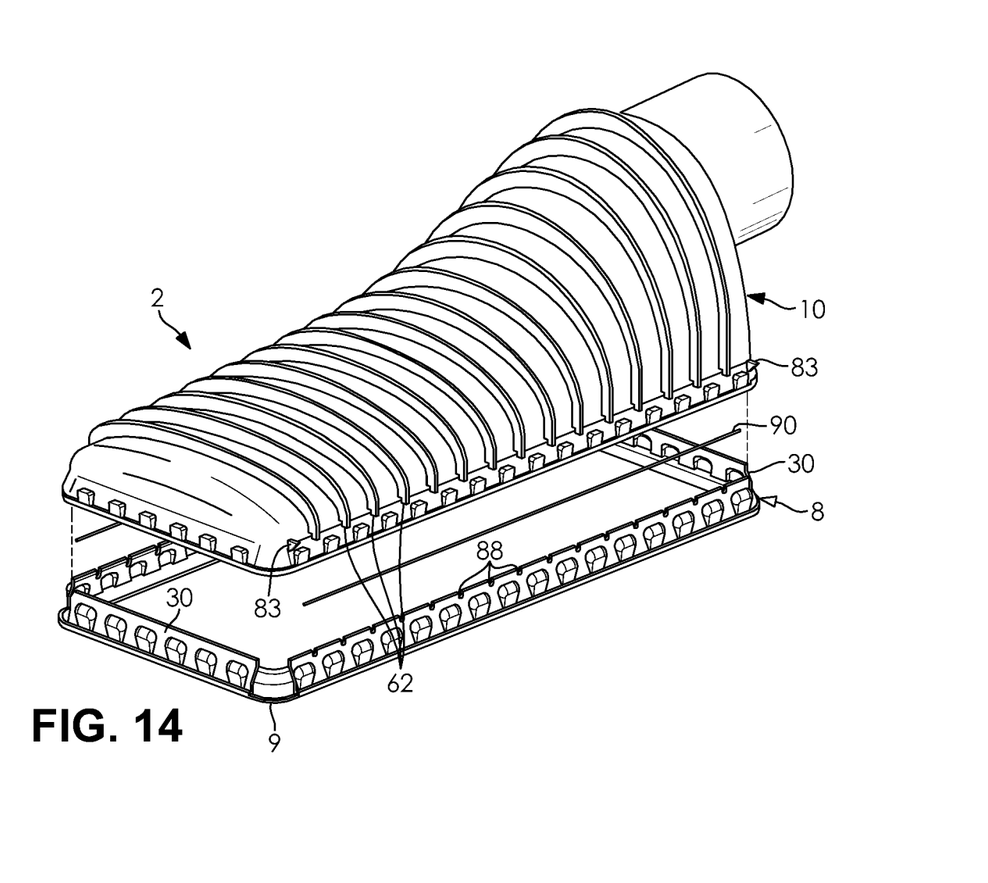
FIG. 14 is an exploded perspective view of a heat exchanger having a modified fluid reservoir, a modified header, and a coupling rod according to an embodiment of the present invention.
Figure 15:
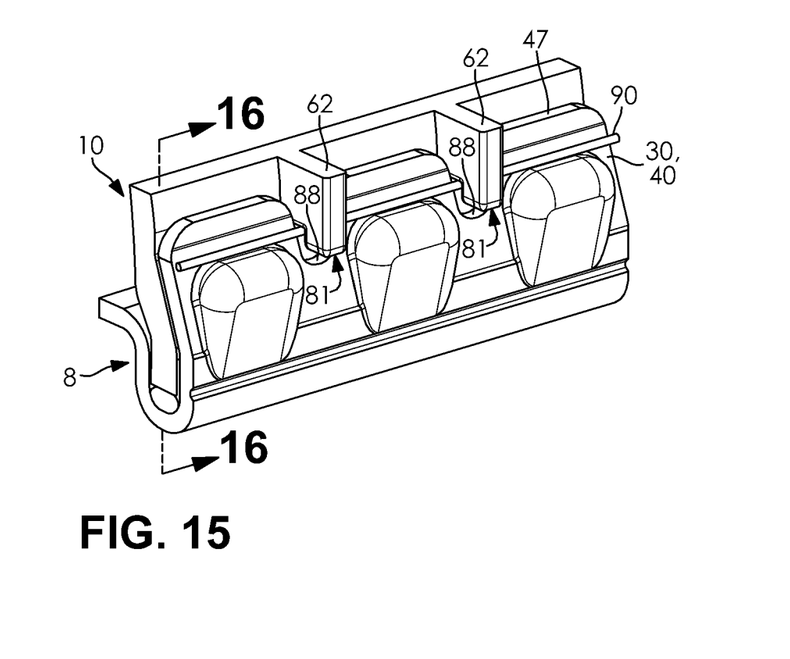
FIG. 15 is an enlarged fragmentary cross-sectional perspective view of the heat exchanger of FIG. 14 following reception of the coupling rod between a portion of the fluid reservoir and a portion of the header to form a retaining feature of the heat exchanger.
Figure 16:
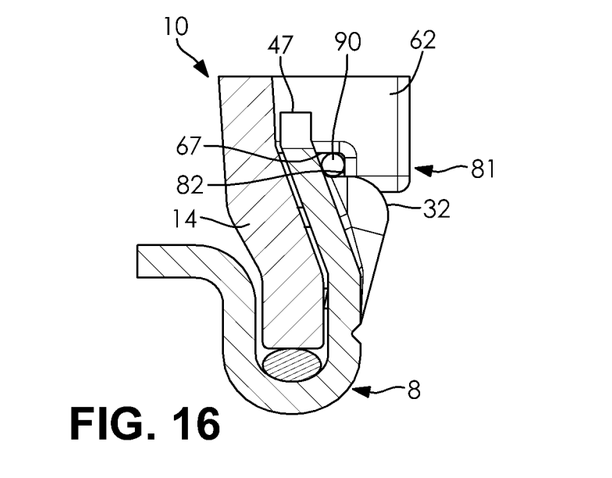
FIG. 16 is an enlarged fragmentary cross-sectional view of the heat exchanger as taken from the perspective of section lines 16-16 of FIG. 15.

FIGS. 14-16 illustrate a structure and method for retaining the header 8 to the fluid reservoir 10 according to a fourth embodiment of the present invention. The fourth embodiment of the present invention further includes the introduction of a coupling rod 90 for providing mechanical interference between the fluid reservoir 10 and one of the mounting tabs 30. The coupling rod 90 is provided as an elongate body having a length that is many times greater than a maximum diameter thereof. The coupling rod 90 is shown as being cylindrical and hence includes a circular cross-sectional shape, but one skilled in the art should appreciate that the coupling rod 90 may include any suitable cross-sectional shape without necessarily departing from the scope of the present invention.

The header 8 once again includes the addition of openings 88 provided as notches or indentations extending from the distal surface 47 of the sidewall 40 of at least one of the mounting tabs 30. The openings 88 are preferably formed on at least two opposing ones of the mounting tabs 30, such as being formed on each of the opposing longitudinal sides of the header 8 corresponding to each of the longitudinal sides of the foot 14 of the fluid reservoir 10. However, the openings 88 may be formed on any of the mounting tabs 30 provided on the header 8 so long as the openings 88 are positioned relative to the end portions 62 of the corresponding ribs 60 as described hereinafter.

As can be seen in FIG. 15, the openings 88 are configured to receive the end portions 62 of the ribs 60 therein when the corresponding mounting tab 30 is bent or folded towards the foot 14 of the fluid reservoir 10 to form the coupling between the first and second coupling features 20, 32. The openings 88 are accordingly spaced with respect to the peripheral direction of the header frame 9 to match the spacing between adjacent ones of the ribs 60 having the end portions 62 extending towards the lip 16 of the fluid reservoir 10.

Each of the end portions 62 is modified to include a hook feature 81 for engaging the coupling rod 90. The hook feature 81 projects from the end surface 67 of each of the end portions 62 at a position spaced outwardly from the outer surface of the foot 14. The hook feature 81 includes an inner surface 82 disposed outwardly of and facing inwardly towards the outer surface of the sidewall 40 of the corresponding mounting tab 30 when the mounting tab 30 is bent to the coupled position.

As can be seen best in FIG. 16, the placement of the mounting tab 30 in the coupled position results in the formation of a passageway for receiving the coupling rod 90 that, when viewed in profile, is formed by the cooperation of the end surface 67 of the end portion 62, the inner surface 82 of the hook feature 81, an outer surface of the second coupling feature 32, and the outer surface of the sidewall 40 of the mounting tab 30. The coupling rod 90 is inserted into the passageway in an axial direction of the coupling rod 90 until the coupling rod 90 is placed into engaging contact with the inner surface 82 of each of the hook features 81 provided on the corresponding side of the fluid reservoir 10 engaging the mounting tab 30.

The coupling rod 90 may be received between a pair of retention tabs 83 projecting outwardly from the outer surface of the fluid reservoir 10 at positions corresponding to the ends of an adjacent one of the mounting tabs 30, wherein the retention tabs 83 are aligned axially with the coupling rod 90 to prevent removal of the coupling rod 90 from the passageway following insertion therein. The coupling rod 90 may be provided to include a suitable degree of flexibility to allow the coupling rod 90 to be flexed in order to pass around one of the retention tabs 83 when the coupling rod 90 is initially inserted into the passageway. A trailing end of the coupling rod 90 is then able to return to axial alignment with the remainder of the coupling rod 90 after the trailing end of the coupling rod 90 has passed by the one of the retention tabs 83 during the flexing thereof. In alternative embodiments, the fluid reservoir 10 is provided in the absence of the retention tabs 83 and the opposing ends of the coupling rod 90 are bent following insertion of the coupling rod 90 into the passageway, wherein the bending of the opposing ends prevents axial removal of the coupling rod 90 from the passageway.

The coupling rod 90 accordingly provides mechanical interference between the outer surface of the mounting tab 30 and the inner surface 82 of each of the hook feature 81 projecting from the fluid reservoir 10, thereby preventing outward bending of the mounting tab 30 away from the foot 14 of the fluid reservoir 10.

Figure 17:
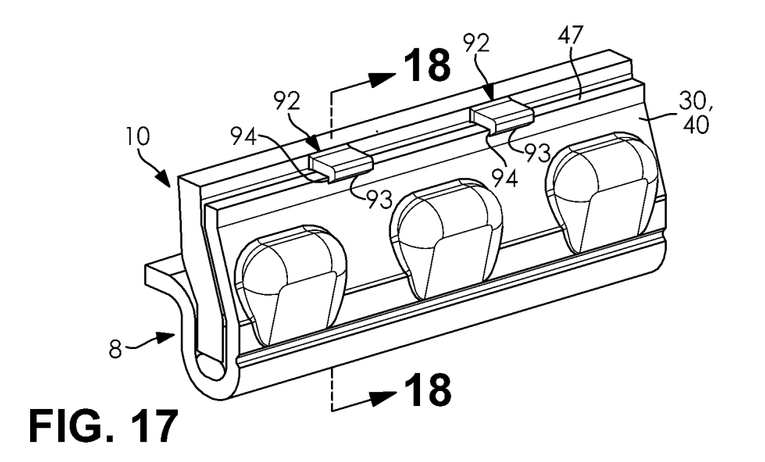
FIG. 17 is an enlarged fragmentary cross-sectional perspective view of the heat exchanger according to another embodiment of the present invention.
Figure 18:
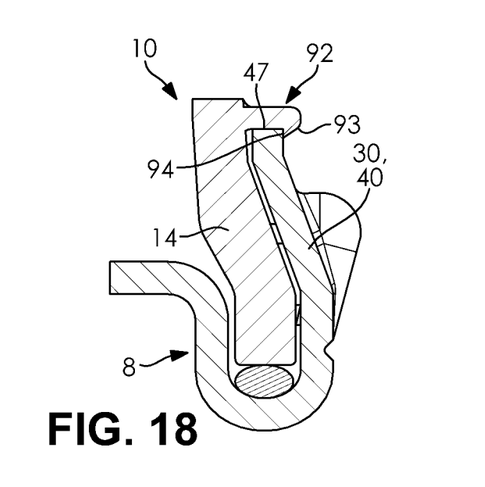
FIG. 18 is an enlarged fragmentary cross-sectional view of the heat exchanger as taken from the perspective of section lines 18-18 of FIG. 17.

FIGS. 17 and 18 illustrate a structure and method for retaining the header 8 to the fluid reservoir 10 according to a fifth embodiment of the present invention. The fifth embodiment of the invention includes the modification of the fluid reservoir 10 to include at least one snap-fit coupling feature 92, whereas the header 8 remains in the form shown and described in reference to FIG. 1. The fluid reservoir 10 may be provided with a plurality of the snap-fit coupling features 92 spaced apart from each other with respect to the peripheral direction of the foot 14 or the fluid reservoir 10, as desired. The snap-fit coupling features 92 are positioned to project outwardly from the outer surface of the fluid reservoir 10 immediately adjacent the distal surface 47 of one of the mounting tabs 30 when in the coupled position in similar fashion to the coupling rib 70 described hereinabove.

Each of the snap-fit coupling features 92 includes an outwardly facing pressing surface 93, an inwardly facing retaining surface 94, and a projecting portion 95 for spacing the pressing surface 93 and the retaining surface 94 from the surrounding portions of the outer surface of the fluid reservoir 10. The pressing surface 93 intersects the retaining surface 94 and is arranged at an acute angle relative thereto. The retaining surface 94 is arranged substantially parallel to adjacent and surrounding portions of the outer surface of the fluid reservoir 10 while the pressing surface 93 is tapered outwardly as the pressing surface 93 extends away from the retaining surface 94 in a direction away from the lip 16 of the fluid reservoir 10. The projecting portion 95 extends outwardly from the outer surface of the fluid reservoir 10 a sufficient distance to space the retaining surface 94 from the outer surface of the fluid reservoir 10 by a distance at least as great as the thickness of the sidewall 40 of the mounting tab 30 at the distal surface 47 thereof.

During the bending of each of the mounting tabs 30 towards the foot 14 the distal portion of each of the mounting tabs 30 initially engages the pressing surface 93 of each of the snap-fit coupling features 92. At least one of each of the mounting tabs 30 and/or each of the projecting portions 95 of the snap-fit coupling features 92 is caused to elastically deform as each of the mounting tabs 30 is continued to be pressed until the distal surface 47 of each of the mounting tab 30 passes by each of the pressing surfaces 93 and subsequently each of the retaining surfaces 94. The components then snap back elastically with the distal portion of each of the mounting tabs 30 disposed inwardly of the retaining surface 94 of each of the corresponding snap-fit coupling features 92. The retaining surface 94 of each of the snap-fit coupling features 92 forms a mechanical obstruction for preventing outward bending of each of the mounting tabs 30 away from the foot 14 of the fluid reservoir 10.

The snap-fit coupling features 92 may include alternative structures allowing for the reception of one of the mounting tabs 30 therein while also retaining the position of the corresponding one of the mounting tabs 30 without necessarily departing from the scope of the present invention. For example, the pressing surface 93 and the retaining surface 94 may be formed at suitable locations on the previously disclosed coupling rib 70 in order to interact with the distal portion of the mounting tabs 30 in the manner described above. The pressing surface 93 may also be configured to initially contact a different portion of the mounting tab 30, such as an edge forming one of the openings 48, 58, 88 penetrating the mounting tab 30, as desired.

The methods and structures disclosed herein may be separated into three different general categories. A first category is illustrated by the first embodiment including the fasteners 52 and by the fourth embodiment including the coupling rods 90, each of which are directed towards the use of an independently provided retaining component that is introduced to prevent the outward bending of the mounting tabs 30 after being placed in the coupled position. A second category is illustrated by the second embodiment and the third embodiment, each of which discloses the plastic deformation of the fluid reservoir 10 to cause the deformed portion of the fluid reservoir 10 to overlay one of the mounting tabs 30 for forming a mechanical obstruction in order to prevent the outward bending of the mounting tabs 30 after having been placed in the coupled position. A third category is illustrated by the snap-fit connection of the fifth embodiment, which discloses a structure of the fluid reservoir 10 allowing for the retaining of the mounting tabs 30 in the absence of the introduction of an additional component or the addition of an additional deforming process for providing a mechanical obstruction.

In all cases, each of the disclosed retaining features is configured to prevent disengagement of one of the mounting tabs 30 of the header 8 from the foot 14 of the fluid reservoir 10 when subjected to the conditions of operation of the heat exchanger 2, including occasional exposure to especially high pressures as well as the potential for exposure to each of thermal and vibrational cycling. The inclusion of the retaining features accordingly results in the formation of a more robust heat exchanger 2 that can be produced cost effectively due to the relatively simple structures and processes contemplated herein for introducing the retaining features into the heat exchanger 2.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A heat exchanger comprising:
   a fluid reservoir having a peripherally extending foot;
   a header having a mounting tab bent to engage the foot of the fluid reservoir to couple the header to the fluid reservoir; and
   a retaining feature configured to prevent disengagement of the mounting tab of the header from the foot of the fluid reservoir, wherein the retaining feature is formed by deforming a portion of the fluid reservoir to overlay a portion of the mounting tab after the mounting tab is bent to engage the foot of the fluid reservoir, and wherein the deformed portion of the fluid reservoir is provided on a rib projecting from an outer surface of the fluid reservoir, wherein the rib is disposed adjacent a distal surface of the mounting tab, and wherein the deforming of the portion of the fluid reservoir includes the formation of a projection in the rib for preventing movement of the distal surface of the mounting tab, and wherein the rib projects laterally outwardly from the outer surface of the fluid reservoir and away from the foot of the fluid reservoir.

2. The heat exchanger of claim 1, wherein the deforming of the portion of the fluid reservoir includes one of electrical resistance heating the portion of the fluid reservoir or ultrasonic heating the portion of the fluid reservoir.

3. The heat exchanger of claim 1, wherein the deformed portion of the fluid reservoir is an end portion of the rib, wherein the end portion of the rib is received into an opening formed in the mounting tab when the mounting tab is bent to engage the foot of the fluid reservoir.

4. The heat exchanger of claim 1, wherein the foot of the fluid reservoir is received within a peripherally extending base portion of the header, wherein the mounting tab extends from and bends relative to the base portion of the header.

5. The heat exchanger of claim 1, wherein the fluid reservoir includes a first coupling feature projecting from the foot thereof and wherein the mounting tab of the header includes a second coupling feature forming a cavity on an inner surface of the mounting tab, wherein the second coupling feature is received within the first coupling feature when the mounting tab is bent to engage the foot of the fluid reservoir.

6. A heat exchanger comprising:
   a fluid reservoir having a peripherally extending foot;
   a header having a mounting tab bent to engage the foot of the fluid reservoir to couple the header to the fluid reservoir; and a retaining feature configured to prevent disengagement of the mounting tab of the header from the foot of the fluid reservoir, wherein the retaining feature is formed by deforming a portion of the fluid reservoir to overlay a portion of the mounting tab after the mounting tab is bent to engage the foot of the fluid reservoir, and wherein the deformed portion of the fluid reservoir is provided on a rib projecting from an outer surface of the fluid reservoir, wherein the rib is disposed adjacent a distal surface of the mounting tab, and wherein the deforming of the portion of the fluid reservoir includes the formation of a projection in the rib for preventing movement of the distal surface of the mounting tab, and wherein the rib is formed generally perpendicular to the foot of the fluid reservoir.

* * * * *